Jan. 25, 1927.
H. J. SHAW
1,615,315
CONCRETE MIXTURE
Filed Aug. 26, 1925
2 Sheets-Sheet 1
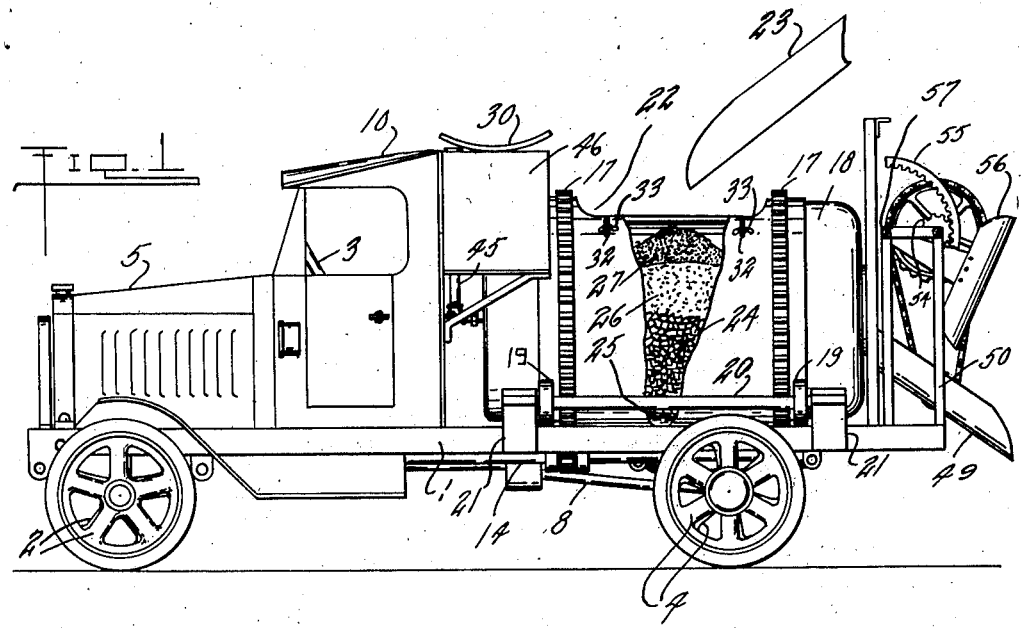
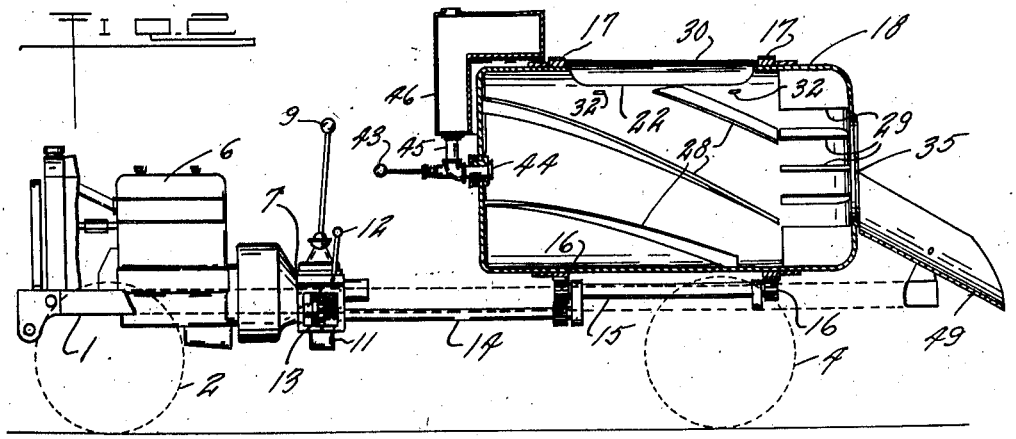
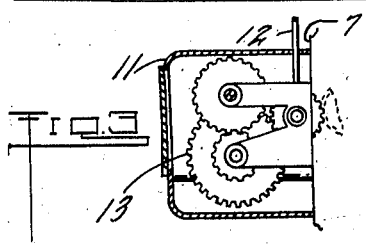

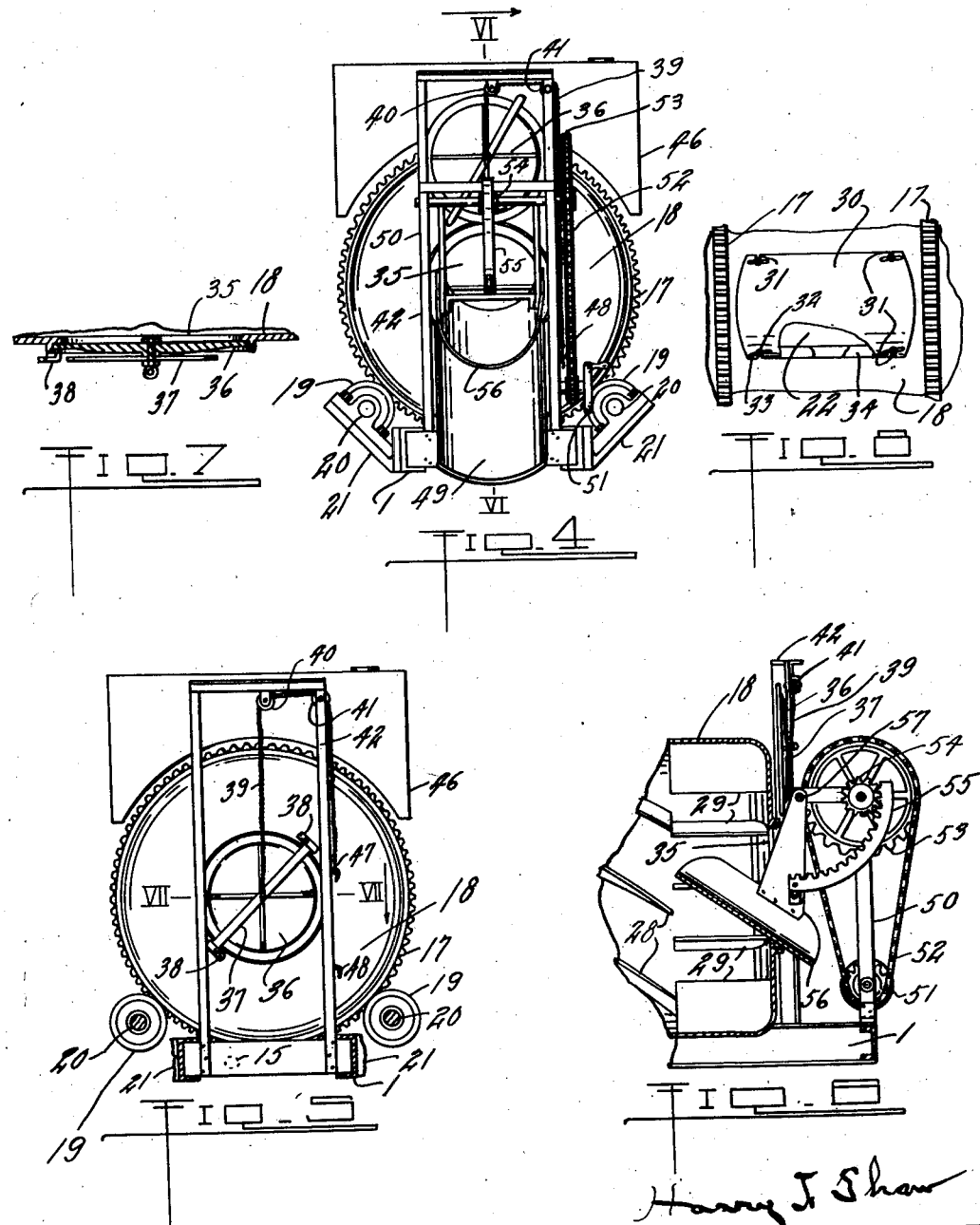

Patented Jan. 25, 1927.

1,615,315

UNITED STATES PATENT OFFICE.

HARRY J. SHAW, OF TOLEDO, OHIO.

CONCRETE MIXTURE.

REISSUED

Application filed August 26, 1925. Serial No. 52,528.

This invention relates to transporting material to be agitated.

This invention has utility when incorporated in a motor truck and rotatable container mounted thereon to be carried and controllably rotated.

Referring to the drawings:

Fig. 1 is a side elevation, with parts broken away, showing an embodiment of the invention in a motor truck with a rotatable cylindrical type of concrete mixer;

Fig. 2 is a view similar to Fig. 1, with parts broken away, showing more clearly the details of control and operation;

Fig. 3 is a detail view of transmission connection from the transmission case for the concrete mixer;

Fig. 4 is a rear elevation of the concrete mixer of Fig. 1, with the parts in dumping relation;

Fig. 5 is a rear view of the mixer in closed position;

Fig. 6 is a partial section of the mixer on the line VI—VI, Fig. 4, showing the parts in dumping position;

Fig. 7 is a partial section on the line VII—VII, Fig. 5, showing the closure for the rear discharge opening; and Fig. 8 is a view of the lateral closure for the concrete mixer.

Chassis or body 1 is shown as having forward pair of wheels 2, as wheels directed or steered by steering wheel 3. This chassis 1 is also sustained by a second or rear pair of wheels 4 as the traction propulsion or driving wheels for the vehicle. Carried above the forward pair of wheels 2 and under hood 5 is motor 6 effective through transmission 7 for operating propeller shaft 8 in driving the pair of rear wheels 4 in propelling the vehicle. Lever 9 in cab 10 serves to determine the speeds desired in vehicle propulsion. The transmission 7 has auxiliary housing 11 therefrom into which extends clutch lever 12 from the cab 10 effective for controlling transmission through speed reduction gear train 13 in the housing 11 for actuating rearwardly extending shaft 14 driving shaft 15 having pinions 16 in mesh with toothed bands 17 of cylindrical vessel or container 18 mounted by rollers 19 on shaft 20 sustained by brackets 21 on the chassis or body 1 in position centrally above the rear pair of wheels 4 of this motor truck. This vessel 18 has lateral opening 22 into which chute 23 may deliver coarse material 24 in heaping relation above water level 25. This water level 25 in the container 18 is primarily to preclude adherence of cement to the interior of this vessel 18 and thus render cleaning and up-keep of the vessel or mixer more readily possible.

Upon this coarse material or broken stone 24 as heaped in the container 18 is dumped void filling fines, as sand 26. Then upon such sand 26 is placed the bulk cement 27. The coarse material is to an extent to hold or sustain the cement away from the water in the container 18. These materials are proportioned according to the desired batch for the concrete mixture as desired. Such may be, for a five-ton truck, two cubic yards of stone; one cubic yard of sand; and one-half cubic yard of cement. This material as loosely dumped or heaped in the concrete mixer vessel 18 bulks for approximately three and one-half cubic yards of loose material and heaps up above the axis of this vessel as rotated controllably from the cab 10.

This vessel 18 has on its inner walls spiral inwardly extending vanes 28 as flanges which may direct into lifting pockets or flanges 29 near the rear end of the vessel 18. The vessel opening 22 is sealed by closure 30 having lateral notches 31 into which swing bolts 32 may be shifted to have wing nuts 33 run up thereon for sealing this closure 30 with the vessel 18. Packing 34 is provided so that such sealing may be sufficiently tight to retain the mixture during the mixing operation as brought about by rotating the cylindrical vessel 18. This vessel 18 has, rearwardly, axial opening 35 which may be sealed by closure 36 carrying transversely extending arm 37 swingable to have wedge engagement with hooks 38. Centrally of this opening 35 extends flexible connection or chain 39 over guide pulleys 40, 41, mounted in guide frame 42.

In the normal operation hereunder, this disclosure has peculiar value in picking up at the supply yard or warehouse from overhead bins, the ingredients of the several respective materials for the batch. This quantity may be hauled directly to the job, as for a paving operation or building construction. The power of the vehicle may be used in such case for transportation. In practice, the interval for mixing the ingredients is a relatively shorter time than the normal interval from a warehouse or yard to the region of the work where the mixture is to be delivered. Accordingly, it is not regularly contemplated to operate the concrete mixer while the truck is in transit. However, with an adequate power plant in the truck or reduced road resistance, such may be done. As the vehicle reaches or approximates the region for use of the mixture, the operator of the vehicle in the cab 10 at the operator's station may pull handle 43 thus opening valve 44 to allow discharge of water by pipe 45 from tank 46 carried by the cab 10 and partially over the forward end of the concrete mixer 18. With this supply of water up to the quantity desired for the batch to supplement the original wash water residue in the vessel 18, the operator may, through handle 12, effect the rotation of the batch of ingredients and water in the mixer 18. In practice, this may run for one or two minutes or the desired time interval.

As the mixing operation is completed, which operation may be at a slow rate of rotation, say eighteen R. P. M., a workman may knock the lever 37 clear of the wedge hooks 38. The material in the vessel 18 being normally of a height to strike against this closure 36 and being so directed in the operation of the vessel 18 by the flanges 28, 29, this closure 30 as released at once springs outward into the guide way 42 so that the workman may through handle 47 operate the chain 39 to bring the handle 47 to hook 48 thus lifting the closure 36 clear of the opening 35 allowing the material to flow by chute 49 for discharge upon the work or in the desired position as in a conveyor.

For fully emptying the concrete mixer 18, a supplemental device is disclosed which is normally clear of the mixer during the mixing operation. This device comprises frame 50 having crank wheel 51 connected by sprocket chain 52 with sprocket wheel 53 carrying pinion 54 in mesh with segment 55 rigid with auxiliary chute 56 mounted in bearing 57 coaxial with the segment 55. The operation of the crank wheel 51 brings about a shifting of this auxiliary chute 56 from inactive position as shown in Fig. 1 to operative discharge position as shown in Fig. 6 so that the residue of the batch of the concrete as lifted by the flanges 28, 29, may fall upon this chute 56 and thence be conducted to the chute 49 in completing the emptying of the mixer 18. As the mixer is emptied the wash water may be supplied thereto for discharge by way of this auxiliary chute 56 to the chute 49. Thereafter the closure 36 is placed in position and the wash water residue left in the reservoir or vessel 18 or this slight quantity of water introduced into the vessel 18. The vessel is then stopped with the opening 22 upward and the truck is driven back to the source of material supply. The closure 30 is removed by turning back the wing nuts 33 and swinging these bolts out of the slots 31. As this closure 30 is removed, the batch proportions may be received in the vessel 18, while the tank 46 is given another supply of water. This cycle of operations may be expeditiously completed with the result that a single manual handling or mechanical handling of the ingredients for the concrete mixture occurs, and at once the material starts from the warehouse or supply source, it goes directly into the work and there is no loss by improper proportions and there is additional economy in minimizing the labor expense, as well as speed in effecting the work.

It is to be noted as a factor of material value in this disclosure, that the truck is capable under its motor of normal truck travel rate notwithstanding this structure includes therewith a concrete mixer. This means that in transporting the material to the location, such may be accomplished as expeditiously as under any other circumstances, the truck having a travel rate as permitted by the various laws and ordinances or say fifteen to thirty miles per hour.

What is claimed and it is desired to secure by United States Letters Patent is:—

1. The method of supplying a concrete mixture to work comprising dumping of a coarse material into a pile depositing fines and cement on said coarse material to a heaping extent, delivering said heaping mixture to the region of the work, delivering water to said mixture, effecting agitation of the mixture and water on a horizontal axis of rotation extending through the heaping mixture to decrease the gross bulk of said mixture by working the fines and cement into the voids of the coarse material as retained in said pile, and thereafter as a separate controllable step from said agitation discharging said agitated mixture.

2. The method of supplying a mixture to work comprising providing water at a level and of less than the required quantity for the mixture, dumping the coarse material into said water to protrude above the water, dumping fines on said coarse material, isolating water reacting material from said water by depositing on said fines, transporting the mixture to the region of the work, bringing the water content up to the required quantity, and as separate steps agitating, dumping, and washing out to leave a residue of water for repeating the cycle of operations.

3. The method of supplying a mixture to work comprising providing water to a level, dumping coarse material into said water to protrude above the water, dumping fines and water reacting material on said coarse material above the water, transporting the mixture to the region of the work, agitating said mixture on a horizontal axis of rotation as extending through said material, as a step following said agitation discharging said mixture, and washing out to leave a quantity of water for a repetition of the cycle of operations.

4. A vehicle chassis, a pair of forward driving wheels and a pair of rear propulsion wheels mounting the chassis, a concrete mixer disposed centrally above the rear pair of wheels, a motor for the vehicle and mixer disposed above the forward pair of wheels and spaced from the mixer, a cab having therein control mechanism for the vehicle and mixer for operating the mixer independently of propelling the vehicle, said cab abutting the motor and mixer, a water tank mounted rearwardly of the cab and over the mixer, and a controllable discharge operable from the cab for the tank into the mixer.

5. A vehicle chassis, a pair of forward driving wheels and a pair of rear propulsion wheels mounting said chassis, a cylindrical concrete mixer disposed centrally above the rear pair of wheels, a motor for the vehicle and mixer disposed above the forward pair of wheels and spaced from the mixer, a cab having therein control mechanism for the vehicle and for rotating the mixer independently of propelling the vehicle, a water tank mounted rearwardly of the cab and over the mixer, a discharge for the tank axially into the mixer, and control means for said discharge operable from the cab.

6. A concrete mixer rotatable cylindrical shell having a fixed horizontal axis and provided with a lateral charging opening having clearance radially through said shell, and spaced therefrom and independently of said lateral opening an axial discharging opening, a closure for the charging opening conforming to the contour of the cylindrical shell of the mixer, means for anchoring the charging opening closure in position for rotation with said shell, a closure plate for the discharging opening, means for anchoring the discharging closure plate in position for rotation with the shell, and mixer driving means for rotating said mixer shell.

In witness whereof I affix my signature.

HARRY J. SHAW.